United States Patent [19]
Zito

[11] Patent Number: 5,439,757
[45] Date of Patent: Aug. 8, 1995

[54] ELECTROCHEMICAL ENERGY STORAGE AND/OR POWER DELIVERY CELL WITH PH CONTROL

[75] Inventor: Ralph Zito, Chapel Hill, N.C.

[73] Assignee: National Power PLC, London, England

[21] Appl. No.: 128,126

[22] Filed: Sep. 29, 1993

Related U.S. Application Data

[63] Continuation-in-part of Ser. No. 961,111, Oct. 14, 1992, abandoned.

[51] Int. Cl.$^6$ ............................................. H01M 2/38
[52] U.S. Cl. ........................................ 429/51; 429/50
[58] Field of Search .................................. 429/50, 51

[56] References Cited

U.S. PATENT DOCUMENTS

| | | | |
|---|---|---|---|
| 2,615,932 | 10/1952 | Marko | 136/122 |
| 2,669,598 | 2/1954 | Marko | 136/122 |
| 3,077,507 | 2/1963 | Kordesch | 136/86 |
| 3,121,028 | 2/1964 | Story | 136/6 |
| 3,227,585 | 1/1966 | Langford | 136/86 |
| 3,540,934 | 11/1970 | Boeke | 136/86 |
| 3,663,300 | 5/1972 | Nanis et al. | 136/86 |
| 3,920,444 | 11/1975 | Zito, Jr. et al. | |
| 4,038,460 | 7/1977 | Walsh et al. | 429/15 |
| 4,053,684 | 10/1977 | Zito, Jr. et al. | 429/15 |
| 4,069,371 | 1/1978 | Zito | 429/21 |
| 4,117,204 | 9/1978 | Zito, Jr. | 429/19 |
| 4,215,182 | 7/1980 | Ang et al. | 429/15 |
| 4,218,519 | 8/1980 | Frank | 429/15 |
| 4,230,549 | 10/1980 | D'Agostino et al. | 259/8 |
| 4,328,287 | 5/1982 | Sammells et al. | 429/15 |
| 4,339,473 | 7/1982 | D'Agostino et al. | 427/44 |
| 4,343,474 | 8/1982 | Putt | 429/17 |
| 4,390,602 | 6/1983 | Struthers | 429/26 |
| 4,407,902 | 10/1983 | Kummer | 429/15 |
| 4,414,090 | 11/1983 | D'Agostino et al. | 204/252 |
| 4,469,760 | 9/1984 | Giner et al. | 429/21 |
| 4,485,154 | 11/1984 | Remick et al. | 429/14 |
| 4,615,108 | 10/1986 | Tomazic | 29/623.2 |
| 4,786,567 | 11/1988 | Skyllas-Kazacos et al. | 429/19 |
| 4,828,942 | 5/1989 | Licht | 429/50 |

FOREIGN PATENT DOCUMENTS

| | | | |
|---|---|---|---|
| 0039222 | 11/1981 | European Pat. Off. | H01M 16/00 |
| 165000 | 6/1985 | European Pat. Off. | H01M 10/42 |
| 1291005 | 3/1962 | France | |
| 1365569 | 5/1964 | France | H01M 8/70 |
| 1522304 | 3/1968 | France | H01M 8/24 |
| 2146144 | 3/1973 | France | H01M 43/00 |

(List continued on next page.)

OTHER PUBLICATIONS

Thermodynamics of aqueous sulfur species; R.C. Murray J. Electro-Chem Soc 130 4 (1983) 866–869.

(List continued on next page.)

*Primary Examiner*—Olik Chaudhuri
*Assistant Examiner*—C. Everhart
*Attorney, Agent, or Firm*—Antonelli, Terry, Stout & Kraus

[57] ABSTRACT

An electrochemical process for energy storage and/or power generation and apparatus comprises cell array of unit cells (10), each cell comprising a $+^{ve}$ electrode (12) and a $-^{ve}$ electrode (14) with a membrane in each cell dividing it into $+^{ve}$ and $-^{ve}$ chambers (22C and 24C) for catholyte and anolyte solutions (22, 24) which are recirculated through separate pumps (26, 28) and storage tanks (32, 34) and back to the chambers. Mid electrodes, between adjacent cells in the array, provide both a $+^{ve}$ side and a $-^{ve}$ side. A bromine-sulfur couple may be employed.

Means are provided to compensate for pH changes and/or changes in hydroxyl ion concentration in the $+^{ve}$ and/or the $-^{ve}$ sides of the array of cells.

Means are provided to affect some limited occurrence of trans-membrane migration or other losses of bromine, sulfur and/or water and to limit the effects of bromine acidification, while affording high energy storage and high power with stable operation over long periods and to maintain output power and voltage at high levels throughout substantially all the discharge cycle.

6 Claims, 8 Drawing Sheets

FOREIGN PATENT DOCUMENTS

| | | | |
|---|---|---|---|
| 1938580 | 11/1970 | Germany | H01M 13/02 |
| 1571985 | 2/1971 | Germany | H01M 27/30 |
| 61-206180 | 9/1986 | Japan | H01M 12/08 |
| 63-205057 | 8/1988 | Japan | H01M 8/04 |
| 63-221562 | 9/1988 | Japan | H01M 8/18 |
| 1183071 | 7/1989 | Japan | H01M 8/02 |
| 479956 | 2/1968 | Switzerland . | |
| 980596 | 6/1963 | United Kingdom . | |
| 1212387 | 12/1964 | United Kingdom | H01M 27/30 |
| 1211593 | 11/1970 | United Kingdom | H01M 27/04 |
| 1237964 | 7/1971 | United Kingdom . | |
| 1210693 | 10/1971 | United Kingdom | H01M 27/00 |
| 1364795 | 8/1974 | United Kingdom | H01M 27/00 |
| 2042250 | 2/1979 | United Kingdom . | |
| 2010574 | 6/1979 | United Kingdom | H01M 10/36 |
| 1569399 | 6/1980 | United Kingdom | H01M 10/36 |
| WO89/05528 | 12/1988 | WIPO | H01M 10/44 |
| WO/9003666 | 6/1989 | WIPO | H01M 8/20 |

OTHER PUBLICATIONS

Cation exchange selectivity of a perfluosulfonate polymer H.L. Yager ACS Symposium Series 180 (1982) 25–39.

Transport properties of perfluosulfonate polymer membranes; H.L. Yeager ACS SymposiumSeries 180 (1982) 41–63.

The cluster network model of ion clustering; T.D. Gierke ACS Symposium Series 180 (1982) 283–307.

Kinetics of Polysulfide-thiosulfat disproportionation W.F. Giggenbach Inorg Chem 13 7 (1874) 1730–1733.

The blue solution of sulfur in water at elevated temperatures W. Giggenbach Inorg Chem 10 6 (1971) 1306–1308.

The blue solutions of sulfur in salt melts; W. Giggenbach Inorg Chem 10 6 (1971) 1308–1311.

Kinetics of aqueous polysulfide solutions I; P. Lessner J. Electrochem Soc 133 12 (1986) 2510–2516.

Kinetics of aqueous polysulfide solutions III; P. Lessner J. Electrochem Soc 133 12 (1986) 2517–2522.

Kinetics of aqeos polysulfide solutions; P. Lessner J. Electrochem Soc 135 1 (1988) 258–259.

Aqueous polysulphide flow-through electrodes P.M. Lessner J Appl Electrochem 22 (1992) 927–934.

Electrolysis of sodium sulphide solutions W.R. Fetzer (1928) 1787–180 7.

Electrode photoelectrochemical storage cells; Bratin; J. Electrochem Soc 129–11 (1982).

Bromine diffusion through Nafion perfluorinated ion exchange membranes F.G. Will; J. Electrochem Soc. 126 1 (1979) 36–41.

On the nature of blue solutions of sulfur W. Giggenbach J. Inorgs Nucl Chem 30 (1968) 3189–3201.

Equilibria involving polysulfide ions W.F. Giggenbach J. Inorg Chem 13 7 (1974) 1724–1730.

Chemical Abstracts, vol. 112, No. 14, 2nd Apr. 1990, Columbus Ohio, US; Abstract No. 119956n.

Journal of the Electrochemical Society, vol. 117, No. 12, Dec. 1970, Mancehster, N.H. USA; pp. 1527–1529.

Jounal of Elecetrochemical Society 1987, Vo. 134, No. 9 pp. 2137–2141; "An Energetic Medium For Electrochemical".

Batteries International; Jan. 1992 pp. 80–81, Fabjan; Austrians Succeed with Zinc–Bromine Chemical Abstracts, vol. 115, No. 2, 15th Jul. 1991, Columbus, Ohio, US; Abstracts No. 12352x.

Extended Abstracts, vol. 80, No. 2, 5th Oct. 1980, Princeton, N.J., USA pp. 413–414.

Chemical Abstracts, vol. 83, No. 12, 22nd Sep. 1975, Columbus, Ohio US; Abstract No. 110755g.

Proceedings of the 20th Intersociety Energy Conversion Engineering Conf. vol. 2, Aug. 1985, pp. 2.105–2.110.

Extended Abstracts, vol. 83, No. 2., 9th Oct. 1983, Princeton, N.J. USA pp. 165–166.

Journal of the Electrochmical Society, vol. 134, 5th May 1987 Manchestedr, N.H., USA pp. 1064–1070.

Patent Abstracts of Japan, vol. 12, No. 476 (E-693) (3323) 13th Dec. 1988.

ELECTROCHEMICAL ENERGY STORAGE AND/OR POWER DELIVERY CELL WITH PH CONTROL

CROSS REFERENCE TO RELATED APPLICATIONS

The present invention is a continuation-in-part of my U.S. patent application Ser. No. 961,111 filed Oct. 14, 1992 now abandoned.

FIELD OF THE INVENTION

The present invention relates generally to energy storage and power generation systems wherein reversible electrochemical reactions occur at opposite positive (hereinafter $+^{ve}$) and negative (hereinafter $-^{ve}$) electrodes and energy is stored in, and drawn from, an electrolyte in charge and discharge cycles. The reactions of interest for the purposes of this invention are substantially reversible such that driving current into such a system charges the system by storing energy in chemical reagents. The electrochemical reactions take place on either side of an ion-exchange membrane with selective charge carriers being transported through the membrane. During power generation these chemical reactions reverse, supplying current (power) to a load. In particular the present invention relates to those systems where the pH of the electrolytes is controlled.

To restore the cell some systems reconstitute or regenerate the reagents external to the cell, as compared to driving current into the cell.

BACKGROUND OF THE INVENTION

Such energy storage and power generation systems have been known for many years. Major limitations of these systems have resulted from the practical application of what seems to be a simple direct chemical process. Hazardous materials, efficiencies, system size, plugging and clogging, gas formation, "plating out" or precipitation of the materials, membrane diffusion limitations, cost of materials and cost of operation highlight the practical problems. Another limitation of such systems is the loss of power output as the system discharges.

The fundamental chemical process in these systems is characterized by a chemical equation where the reaction proceeds in one direction in the charging of the system and in the opposite direction during the power generation by the system. An example of a redox system is given by the following chemical equation, the term "redox" defining reactions in which a reduction and complementary oxidation occur together.

Eq. 1

In this system, limitations exist since the chromium is expensive and the chromium and iron, meant to be on either side of a membrane, cross over contaminating the other side. This necessitates frequent reprocessing of the electrolyte. Furthermore, noble metal catalysts are required to promote the reaction. My U.S. Pat. No. 4,069,371 entitled, "Energy Conversion", issued on Jan. 17, 1978, describes a system to continuously counter a rising pH tendency.

Another example of an electrochemical cell for the production of electricity is a zinc-bromine cell in which the overall chemical reaction can be written as follows:

Eq. 1a

The main limitation of this system is the non-uniformity of the zinc deposition onto the electrode which leads to an imbalance when an array of cells is cycled.

U.S. Pat. No. 4,485,154 discloses an electrically rechargeable anionically active energy storage and power delivery system using a sulfide-polysulfide catholyte reaction and an iodide-polyiodide, chloride-chlorine or bromide-bromine anolyte reaction, with recirculating electrolytes.

It has been found that a disadvantage of operating the system of U.S. Pat. No. 4,485,154 using the bromine/sulfide couple is that the pH of the catholyte falls as the system is periodically cycled resulting in H+ ions diffusing and being transported electrically into the anolyte, resulting also in a lowering of the pH of the anolyte with the attendant formation of $H_2S$.

U.S. Pat. No. 4,343,868 discloses a zinc-bromine battery in which the zinc forms the negative electrode and takes part in the electrochemical reactions in the cell. One of the side reactions is the evolution of hydrogen with an attendant loss of hydrogen ions from the negative electrolyte and a rise in pH. Means are provided in U.S. Pat. No. 4,343,868 for the adjustment of the pH of the negative electrolyte in the downwards direction by the generation of hydrogen ions.

An object of this invention is to provide an energy storage and/or power delivery process and apparatus in which the pH changes and/or the changes in concentration of hydroxyl ions in either or both of the chambers of the cell are compensated for by the generation of hydroxyl ions.

It is another object of this invention to provide such a process which can be chemically recharged by replacing or reconstituting one or both electrolytes outside the cell making the cell continuously operable.

It is a further object of this invention to provide economical power generation, that is electrically rechargeable.

It is yet another object of the invention to provide a process with a sufficient power density for practical applications.

Another object of this invention is to provide substantially full power even at low states of charge of the system, i.e. the system power production stays reasonably constant over time maintaining substantially the same output until close to complete discharge.

SUMMARY OF THE INVENTION

The foregoing objects are met in a system with pH means to compensate for pH changes of the electrolytes.

Accordingly, in one embodiment the present invention provides an electrochemical apparatus for energy storage and/or power delivery comprising:

(a) means for maintaining and circulating electrolyte flows in a fully liquid system in which the active constituents are fully soluble in a single cell or in an array of repeating cell structures, each cell with a chamber ($+^{ve}$ chamber) containing an inert $+^{ve}$ electrode and a chamber ($-^{ve}$ chamber) containing an inert $-^{ve}$ electrode, said chambers being separated one from another by an ion exchange membrane, the electrolyte circulating in the $-^{ve}$ chamber of each cell during power delivery containing a sulfide, and the electrolyte circulating in the $+^{ve}$ chamber during power delivery containing a liquid oxidising agent, (b) means for restoring or replenishing the electrolytes in said $+^{ve}$ chamber and $-^{ve}$ chamber by circulating the electrolyte from each chamber to storage means comprising a volume of electrolyte greater than the cell volume for extended delivery of power over a longer discharge cycle than the cell volume alone would permit, and (c) means to compensate for pH changes and/or changes in the concentration of hydroxyl ions in the $+^{ve}$ and/or the $-^{ve}$ chamber which comprises means for generating $OH^-$ ions by decomposition of water.

In a further embodiment, the present invention provides an electrochemical process for energy storage and/or power delivery comprising the steps of:

(a) maintaining and circulating electrolyte flows in a fully liquid system in which the active constituents are fully soluble in a single cell or in an array of repeating cell structures, each cell with a chamber ($+^{ve}$ chamber) containing an inert $+^{ve}$ electrode and a chamber ($-^{ve}$ chamber) containing an inert $-^{ve}$ electrode, said chambers being separated one from another by an ion exchange membrane, the electrolyte circulating in the $-^{ve}$ chamber of each cell during power delivery containing a sulfide, and the electrolyte circulating in the $+^{ve}$ chamber during power delivery containing a liquid oxidising agent, (b) restoring or replenishing the electrolytes in said $+^{ve}$ chamber and $-^{ve}$ chambers by circulating the electrolyte from each chamber to storage means comprising a volume of electrolyte greater than the cell volume for extended delivery of power over a longer discharge cycle than the cell volume alone would permit, and (c) compensating for pH changes and/or changes in the concentration of hydroxyl ions in the $+^{ve}$ chamber and/or the $-^{ve}$ chamber by the generation of $OH^-$ ions and hydrogen gas by the decomposition of water.

In a preferred embodiment of the present invention the liquid oxidising agent circulating in the $+^{ve}$ chamber during power delivery is bromine, the chemical reaction involved being described by the following equation:

Eq. 2 where the ions are provided from salts of these reagents. For Eq. 2 the salts are preferably the potassium salts, KBr and $K_2S$ but the sodium salts will work almost as well, except that $Na_2S$ is much less soluble than $K_2S$. The structure comprises an array of cells each of which has a $+^{ve}$ electrode and a $-^{ve}$ electrode. An ion exchange membrane in each cell between the electrodes divides the cell into $+^{ve}$ and $-^{ve}$ chambers. The electrochemical reaction of Eq. 2 actually occurs in separate but dependent bromine and sulfur reactions. The bromine reaction takes place on the $+^{ve}$ side of the membrane and the sulfur reaction on the $-^{ve}$ side of the membrane.

When charging (restoring the cell) occurs, Eq. 2 goes from right to left, and when discharging (power supplied to a load), Eq. 2 goes from left to right.

With regard to the bromine reaction, during charging $Na^+$ ions are transported across the membrane from the $+^{ve}$ to the $-^{ve}$ side to balance the charge and transform $Na_2S_5$ to $Na_2S$. The sulfur which is present as a doubly charged polysulfide ion ($S^{2-}.S_x$, where $x$ may be as high as 4) is reduced initially to $S^{2-}.S_{x-1}$, and eventually to $S^{2-}$. $Br^-$ is oxidized to $Br_2$ which goes into solution as tribromide ions $Br_3^-$ which are available to re-oxidize the $S^{2-}$ ions back to sulfur during discharge. Free bromine is not very soluble in water. Only about 3 to 4 grams per 100 cc of water. However it is very soluble in bromide salt solutions in which it forms polybromide ions. The major source of bromine is from sea water.

Molecular bromine ($Br_2$) is formed as the necessary part of the electrochemical reactions, and $Br_2$ tends to react with water to form acids, e.g. (in simplified statement):

Eq. 3

The presence of activated carbon on the surface of the $+^{ve}$ electrode further promotes (catalyzes) this process of acid formation, and so it is generally not used on the $+^{ve}$ electrode. But no such problem exists for the chemistry in the $-^{ve}$ side and activated carbon is used on the $-^{ve}$ electrode.

Also, if the $+^{ve}$ side electrode becomes partially starved during charging, and if the charging potential is high enough, some oxygen will be generated and released from that electrode, also resulting in the creation of $H^+$ ions (acid) in the electrolyte.

Such formation of acid is to be avoided, or at least minimized, because the $H^+$ ions will diffuse and be transported electrically to the $-^{ve}$ side through the cation membrane. All of this results in lowering of pH in the $-^{ve}$ side with the attendant formation of $H_2S$. The system subsequently performs poorly. The present invention provides a mechanism for adjusting the pH ($H^+$ generation) in the $+^{ve}$ side.

Flow of the electrolytes on both sides of the membrane is provided, preferably a re-circulation rather than a once through flow in the majority of end uses. These recirculating electrolytes are stored in independent containers where the quantity may be large enough for the specific requirements of a preferred embodiment. The circulation also allows the electrolytes to be filtered, or otherwise reconstituted on a routine basis, without taking the system off-line.

For the bromine system, as the electrolyte in the $+^{ve}$ side is circulated, the bromine is absorbed out of solution at a surface of the $+^{ve}$ electrode and/or in a porous substrate thereof. This provides a benign porous structure where the bromine may reside in higher concentrations (i.e. for greater availability at higher current demands). The porous nature provides a large surface area which enhances efficiency during discharge. The porous material preferably comprises particles of silicon dioxide, or a mixture of silicon dioxide/activated carbon, the particles providing a large surface area. Activated carbon alone may be used but such use increases the hydrolysis of $Br_2$ with water, forming HBr and lowering the pH too much. The silicon dioxide reduces the formation of the acid. The silicon dioxide porous surface provides bromine promptly for the discharge requirements, and thus provides full power until substantially fully discharged. During this discharge the output voltage of the cell is nearly constant, with little polarization loss.

It will be understood that the electrolyte circulating in the $+^{ve}$ chamber during power delivery may contain a liquid oxidising agent other than bromine. If the pH in the $+^{ve}$ chamber falls during the electrochemical reaction, then the pH of the electrolyte in the $+^{ve}$ chamber will be adjusted in accordance with the invention. If the pH in the $+^{ve}$ chamber does not fall then adjustment of the pH in that chamber by the generation of $OH^-$ ions will not be required.

The process and apparatus of the present invention may be used for the adjustment of the pH and/or hydroxyl ion concentration in the $-^{ve}$ chamber only of the cell. The means for compensation of pH changes and/or hydroxyl ion concentration changes in the $-^{ve}$ chamber involves the generation of OH$^-$ ions, since it is generally necessary to operate the $-^{ve}$ side of the cell at a high pH and/or in the presence of free hydroxyl ions to prevent the formation of HS$^-$ ions from the sulfide contained in the $-^{ve}$ electrolyte.

The $-^{ve}$ side of the system has an electrode which absorbs the S$^{2-}$ solution for subsequent discharge and enhances performance similar to that described at the $+^{ve}$ electrode. Porous activated carbon is generally employed. The activated carbon at the $-^{ve}$ electrode acts to increase the sulfide reaction rate.

Mid-electrodes (also defined as intermediate or bipolar electrodes) combine the above such that a $+^{ve}$ electrode is provided on one surface and a $-^{ve}$ electrode on another surface formed on the same substrate.

There may be some sulfide leakage via diffusion through the membrane from the $-^{ve}$ side into the $+^{ve}$ side. The result is free sulfur in the electrolyte which is filtered during the circulation of the electrolyte. One way to overcome system degradation due to such leakage is to provide that periodically the filter is switched into the circulation of the electrolyte in the $-^{ve}$ electrode side. Here the sulfur is restored by being resolubilized as polysulfide and fed into the electrolyte for reuse.

In the bromine system there may also be some diffusion of the bromine ions into the $-^{ve}$ electrode side resulting in a reagent loss on the $+^{ve}$ side, an electrolyte composition imbalance and a coulombic loss. This situation may be corrected by introducing NaBr of an appropriate [initial] concentration into the $-^{ve}$ electrode side to provide Br$^-$ ions which diffuse back to the $+^{ve}$ side and so balance the bromine migration from the $+^{ve}$ side.

The apparatus incorporates therein an ion transport means, preferably for the bromine system a membrane with, preferably a fluorocarbon polymer structure (having high chemical resistance to bromine) grafted with styrene via gamma irradiation and functionalized with sulfonic acid or carboxylic acid end groups to provide charge carriers. The membrane is cation selective (positive ions, such as Na$^+$, will be transported through it) that also provides an effective block against S$^{2-}$ migration through the membrane.

It is also possible with this system periodically to replace, either in whole or in part, the electrolyte without interrupting the operation of the cells. This permits processing or replenishing of the electrolyte external to the cell Alternative preferred embodiments substitute potassium, lithium or ammonium, or mixtures thereof, and other appropriate substitutes for the sodium in one or both of the bromine and sulfide solutions.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1A:
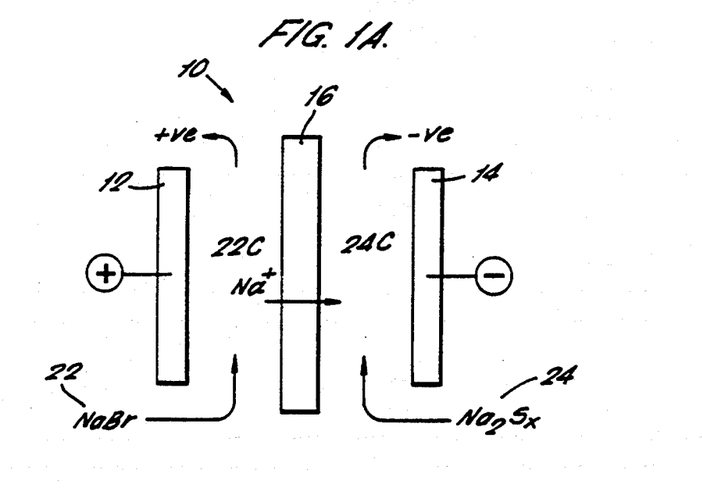
FIG. 1A is a schematic view of the basic components of a cell used in a preferred embodiment of the invention.

FIG. 1A shows a cell 10 with a $+^{ve}$ electrode 12 and a $-^{ve}$ electrode 14 and a cation membrane 16 formed from a fluorocarbon polymer with styrene sulfonic acid functional groups to provide charge carriers. The membrane 16 acts to separate the $+^{ve}$ and $-^{ve}$ sides of the cell 10 and is selected to minimize migration of bromine from the $+^{ve}$ side to the $-^{ve}$ side and to minimize migration of S—ions from the $-^{ve}$ side to the $+^{ve}$ side. An aqueous solution 22 of NaBr is provided in a chamber 22C formed between $+^{ve}$ electrode 12 and the membrane 16 and an aqueous Na$_2$S$_x$ solution 24 is provided in a chamber 24C formed between the $-^{ve}$ electrode 14 and the membrane 16. A K$_2$S$_x$ solution, which is more soluble and more expensive than the Na$_2$S$_x$ solutions, is used in another embodiment.

When the cell is in the discharged state, a solution of NaBr of up to 6.0 molar concentration exists in the chamber 22C of the cell and a solution of Na$_2$S$_5$ at 0.5 to 1.0 molar, exists in chamber 24C of the cell. Higher molarity is possible with K$_2$S$_5$.

As the cell is charged, Na$^+$ ions are transported through the cation membrane 16, as shown in FIG. 1A, from the $+^{ve}$ to the $-^{ve}$ side of the cell. Free bromine is produced via oxidation of the bromide ions at the $-^{ve}$ electrode and dissolves as a tribromide or pentabromide ion. Sulfur is reduced at the $-^{ve}$ electrode and the pentasulfide, Na$_2$S$_5$, salt eventually becomes the monosulfide as the charging proceeds to completion. At the $+^{ve}$ side the following reaction occurs, Eq. 4 $2Br^- \rightleftharpoons Br_2 + 2e^-$ and at the $-^{ve}$ side the following reaction occurs, Eq. 5 $S + 2e^- \rightleftharpoons S^{2-}$.

The membrane separates the two electrolytes and prevents bulk mixing and also retards the migration of S$^{2-}$ ions from the $-^{ve}$ side, and the migration (diffusion) of Br$^-$ and Br$_2$ from the $+^{ve}$ to the $-^{ve}$ side. Diffusion of S$^{2-}$ results in coulombic loss as well as suspended precipitates in the $+^{ve}$ electrolyte. Any S$^{2-}$ ions present in the $+^{ve}$ side will be oxidized by the Br$_2$ produced during charge. The sulfur is not soluble in water or NaBr solution and will come out as a fine powder suspension or precipitate.

With [over] extended cycling there may be an accumulation of sulfur in the $+^{ve}$ side of the cell. If the sulfur is trapped by an in-line filter, it can be returned to the $-^{ve}$ side for re-solubilizing at suitable times during operation.

When providing power, the cell is discharging. During this action reversible reactions occur at the two electrodes. At the $+^{ve}$ side electrode 12, bromine is reduced to Br−, and at the $-^{ve}$ electrode, the $S^{2-}$ ion is oxidized to molecular S. The electrons produced at the $-^{ve}$ electrode form the current through a load. The chemical reaction at the $+^{ve}$ electrode produces 1.06 to 1.09 volts and the chemical reaction at the $-^{ve}$ electrode produces 0.48 to 0.52 volts. The combined chemical reactions produce an open circuit voltage of 1.54 to 1.61 volts per cell.

The energy density of the bromine/sulfur couple will be limited by the permissible maximum concentration of the $Br_2$ in the $+^{ve}$ side, not by the solubilities of the constituent salts, such as NaBr and $Na_2S$, which are high.

The reacting ions are $S^{2-}$ and $Br^-$ going back and forth to the elemental stage during the oxidation/reduction processes. The cation which is associated with them essentially takes no part in the energy producing process. Hence, a cation of "convenience" is chosen. Sodium or potassium are preferred choices. Sodium and potassium compounds are plentiful, they are inexpensive and have high water solubilities. Lithium and ammonium salts are also possibilities, but at higher cost.

Figure 1B:
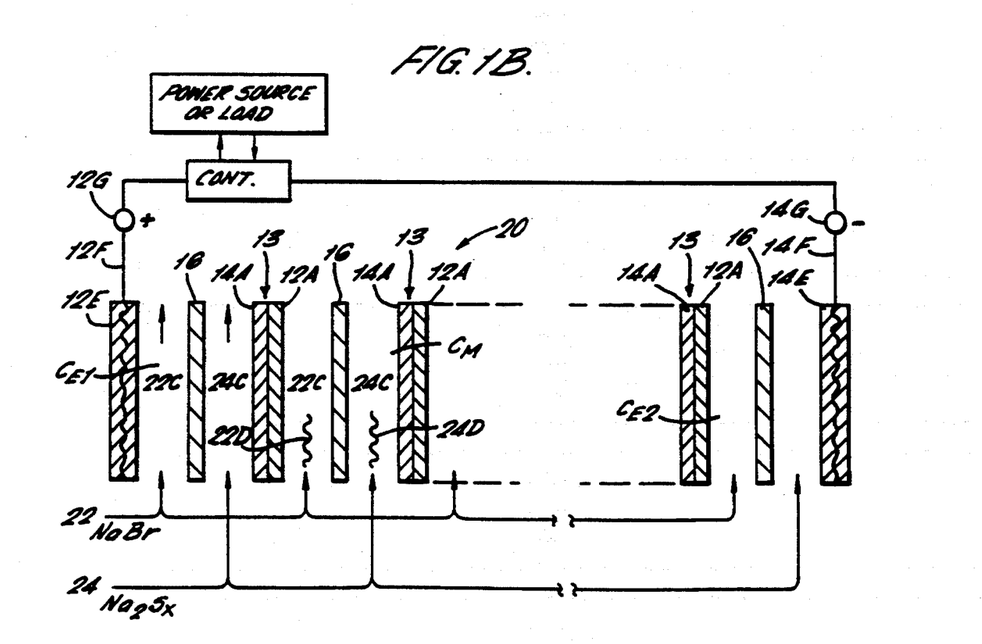
FIG. 1B is a diagram of cell arrays using the system of FIG. 1A and showing a manufacturing step thereof at FIG. 1C.

FIG. 1B shows an array 20 of multiple cells connected in electrical series and fluid parallel. Multiple mid-electrodes 13 (each one having a $+^{ve}$ electrode side 12A and $-^{ve}$ electrode side 14A) and end electrodes 12E ($+^{ve}$) and 14E ($-^{ve}$) are spaced out from each other by membranes 16 and screen or mesh spacers (22D,24D) in all the cell chambers 22C, 24C, (portions of two of which 22D, 24D are shown by way of example) to form end cells $C^{E1}$ and $C^{E2}$ and an array of n# of mid cells $C_M$ (typically 10-20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) driving a vehicle) or power sources (e.g. a utility power grid when used as a load-levelling device).

Figure 1C:
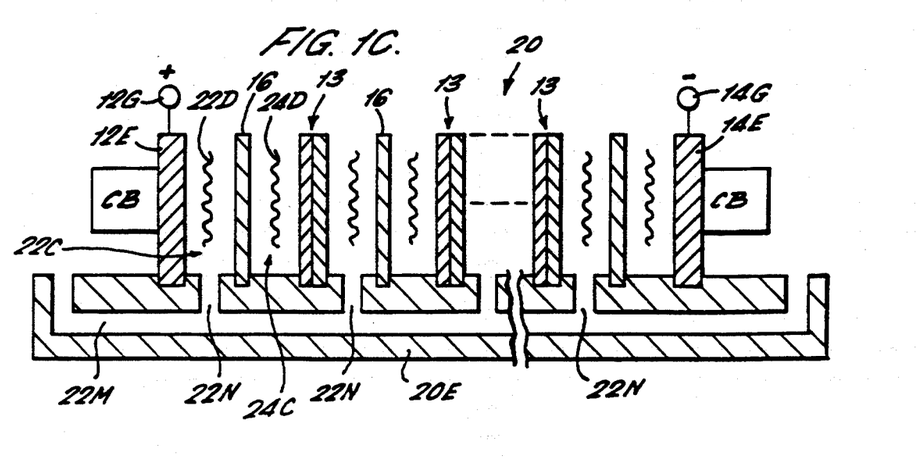

FIG. 1C shows the manner of encapsulating a cell array such as that of FIG. 1B. A cell array 20 (such as shown in FIG. 1B) is held between clamping blocks CB and dipped at one edge into a shallow container having a bath of a liquid epoxy resin therein (not shown). The epoxy resin hardens to form a wall of the battery. Flow conduits such as manifold 22M with feed tubes 22N for the NaBr solution feed are provided (a similar arrangement [not shown] being provided for the sodium sulfide solution feed). These flow conduits are simultaneously encapsulated with the electrode and membrane edges.

The battery is rotated 90 degrees and the process repeated three times to form four long walls. Manifolds and tubes for electrolyte withdrawal are provided at the top face. Additional encapsulation can be provided at the backs of end electrodes 12E, 14E.

An alternative approach to encapsulation is to use a dissolvable or low melting point solid to fill the cell chambers 22C, 24C and the manifold and tubes of all cells of battery 20. The battery is then dipped in its entirety into a deep epoxy resin bath. After the epoxy resin hardens, the battery is subjected to water or other solvent fed through its circulatory path to dissolve the solid, or is heated to melt the solid.

Another effective encapsulation approach is a plate and frame structure (not shown) which has enough short term sealing integrity to permit a single pouring of encasing polymer (epoxy). The polymer provides the long term sealing along all edges of the electrodes and membranes.

In any embodiment of encapsulation the goal is to safeguard against: (a) cell to cell leakage, (b) leakage between tubes and between manifolds, (c) leakage to the environment and (d) to provide short lengths of narrow cross section tubes.

Figure 2:
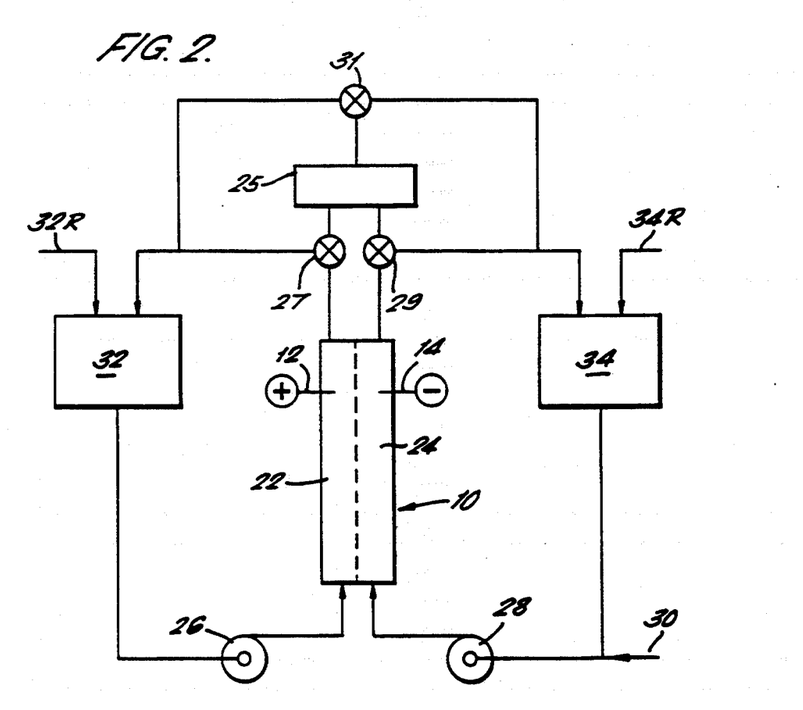
FIG. 2 is a block diagram of a fluid flow system using the cell of FIG. 1A.

FIG. 2 shows a free flow system, a power generation/storage system utilizing one or more of the batteries or cell array formats 20. Each cell 10 receives electrolyte through pumps 26 and 28 for the NaBr and $Na_2S_5$ solutions (22 and 24, respectively). The electrolytes 22 and 24 are stored in containers 32 and 34. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent.

Figure 3A:
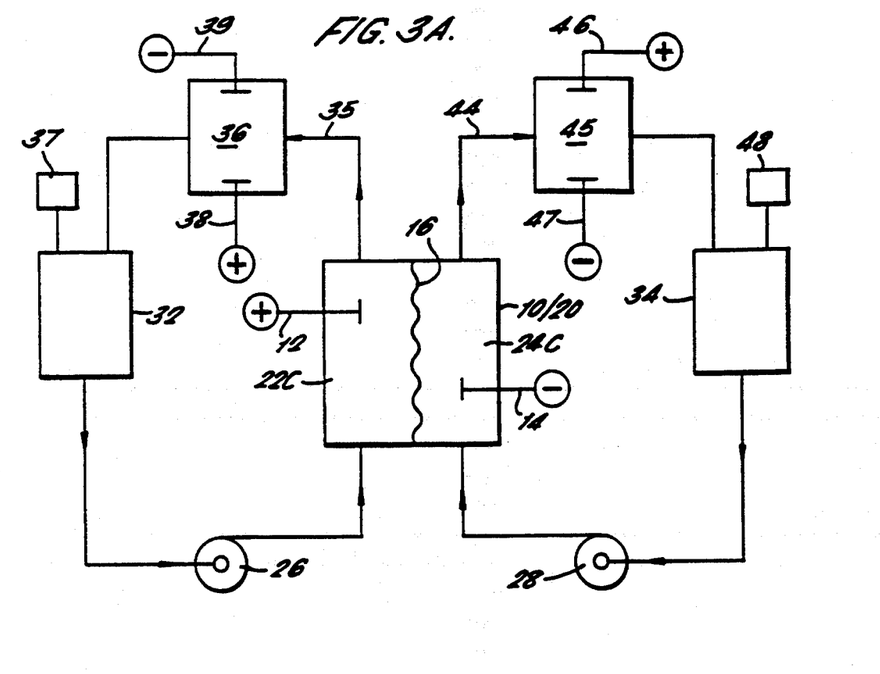
FIG. 3A is a block diagram of the pH control in both the $+^{ve}$ and $-^{ve}$ sides of the cell of FIG. 1A.

FIG. 3A shows a complete system with pH control for the electrolytes from both cell chambers 22C and 24C, chamber 22C having a $+^{ve}$ electrode 12 therein, and chamber 24C having a $-^{ve}$ electrode 14 therein. It will be understood that pH control will be required in some circumstances in one side of the cell only, and this is within the scope of the invention. The electrolytes 22 and 24 are pumped from tanks 32 and 34, respectively, into the respective chambers 22C and 24C by means of pumps 26 and 28.

Electrolyte 22 leaving chamber 22C of the cell is passed along line 35 to a pH compensation cell 36. The pH compensation cell 36 has a $+^{ve}$ electrode 38 and a $-^{ve}$ electrode 39 provide therein. The pH of the electrolyte 22 flowing through the pH compensation cell 36 is raised by the evolution of $H_2$ gas. The hydrogen gas so produced is permitted to escape through a vent 37 provided in tank 32. The $H_2$ gas is liberated via decomposition of water, leaving behind $OH^-$ ions to compensate for the $H^+$ ions generated at the $+^{ve}$ electrode.

Figure 3B:
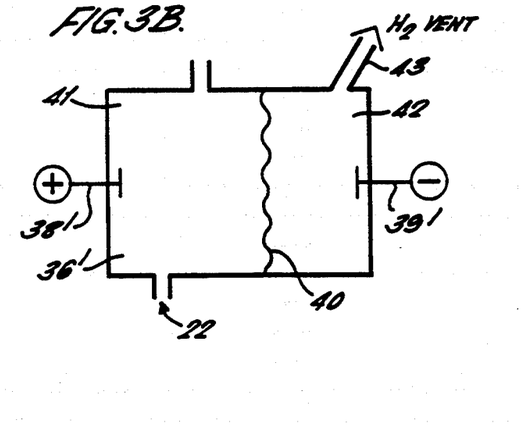
FIG. 3B is an alternative type of pH control cell.

An alternative pH compensation cell for use on the $+^{ve}$ electrolyte side is shown in FIG. 3B. In this embodiment cell 36' is provided with a $+^{ve}$ electrode 38' and a $-^{ve}$ electrode 39'. The cell is divided into two compartments 41 and 42 by means of a microporous membrane separator 40. The $H_2$ produced by the decomposition of water may be vented directly from cell 36' by means of vent 43, thus making vent 37 on tank 32 redundant.

The applicable half cell reaction for the pH compensation is:

Eq. 6

In the pH compensation cell $Br_2$ is generated at the $+^{ve}$ electrode, and $H_2$ is produced at the $-^{ve}$ electrode thereof, the overall reaction being:

Eq. 7:

Referring to FIG. 3A, the bromine merely dissolves in the $+^{ve}$ electrolyte and becomes available for discharge. The $H_2$ is either liberated at the vent 37 of tank 32, or is vented at the pH cell 36 itself if it employs a membrane, as described with reference to FIG. 3B.

Placing the pH cell 36 in the $+^{ve}$ electrolyte line as shown in FIG. 3A has the advantage of compensating the acid formation in the problem source side, and it generates more $Br_2$ as a by-product, which increases the overall efficiency of the unit.

Coating the $+^{ve}$ electrode with silicon dioxide will prevent the over acidification of the $+^{ve}$ side and may result in the pH in the $+^{ve}$ side rising, rather than falling. This is because the pH in the $+^{ve}$ side will rise as $H^+$ ions are transported across the membrane to the $-^{ve}$ side. Any $H^+$ ions which travel to the $-^{ve}$ side form water and thus are lost from the system. It is possible to modify any rise in the pH in the $+^{ve}$ side by mixing the silicon dioxide coating on the $+^{ve}$ electrode with activated carbon. The silicon dioxide will not directly affect the pH, although the pH will tend to rise as discussed above whilst the activated carbon will tend to cause the pH to fall. A slow decrease in pH is thus provided which can easily be compensated for by the half-cell reaction given in Eq. 6 above. An alternative approach to such pH compensation is to pass at least a part of the $+^{ve}$ electrolyte through a chamber containing activated carbon. During such passage the pH of the $+^{ve}$ electrolyte is lowered as the activated carbon promotes the reaction given in Eq. 5 above. The generation of $H^+$ ions (as HBr) may thus be controlled by varying the amount of electrolyte which is passed through the chamber containing the activated carbon, or by passing the $+^{ve}$ electrolyte through the chamber containing activated carbon only periodically.

Figure 3C:
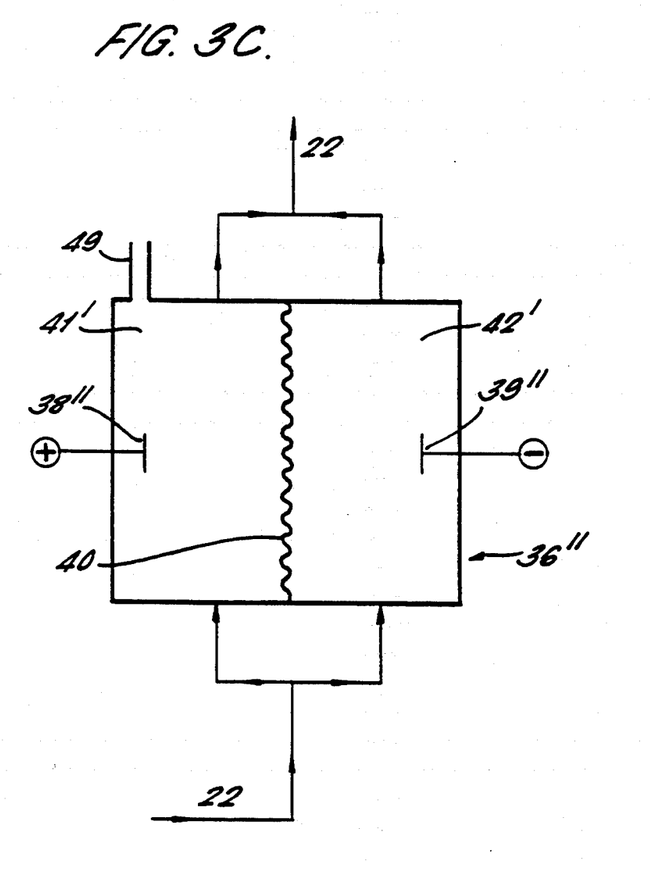
FIG. 3C is a further alternative type of pH control cell.

Another way of controlling the rise of pH in the $+^{ve}$ side, is to employ a different type of pH control cell as shown in FIG. 3C.

This cell is designed with a $Br^-$ ion starved configuration that permits $O_2$ gas to be generated and evolved at the $+^{ve}$ electrode. The overall reaction is:

Eq. 8a  $2H_2O+2Br_2 \rightleftharpoons O_2+4H^++4Br^-$ the reaction at the $+^{ve}$ electrode being:

Eq. 8b  $H_2O \rightleftharpoons 2H^+ + \tfrac{1}{2}O_2 + 2e^-$ and the reaction at the $-^{ve}$ electrode being:

Eq. 8c  $2e^- + Br_2 \rightleftharpoons 2Br^-$

Referring to FIG. 3C, cell 36" is provided with a $+^{ve}$ electrode 38" and a $-^{ve}$ electrode 39". The cell is divided into two compartments 41' and 42' by means of a microporous membrane separator 40. The $+^{ve}$ electrolyte stream is split into two, one part being passed through the $+^{ve}$ side 41' of the cell and the other being passed through the $-^{ve}$ side 42' of the cell. After the split streams exit from the cell they are recombined. The $O_2$ produced by the decomposition of water at the $+^{ve}$ electrode may be vented directly from cell 36" via vent 49.

Referring to FIG. 3A, a pH compensation cell is also placed in the $-^{ve}$ side cell fluid circuit.

The cell 45 has a $+^{ve}$ electrode 46 and a $-^{ve}$ electrode 47 provided therein. The electrolyte 24 leaving chamber 24C of the cell is passed along line 44 to the pH compensation cell 45. By driving electric current from the $+^{ve}$ electrode to the $-^{ve}$ electrode of the cell 45, water is hydrolysed to form $H^+$ and $OH^-$ ions. The flow of $OH^-$ ions into tank 34 helps to maintain electrolyte 24 at a high pH, while $H_2$ is liberated from water at the $-^{ve}$ electrode and is vented through a vent 48 provided on tank 34. At the $+^{ve}$ electrode sulfide ions are oxidized to sulfur, resulting in some net discharge of the system.

The overall reaction is as follows:

Eq. 9:  $2Na_2S + 2H_2O \rightleftharpoons 2NaOH + H_2 + Na_2S_2$

The free sulfur polymerizes the $Na_2S$ to the sodium disulfide as shown above.

The pH cell can employ a microporous membrane or not, depending upon the type of performance versatility and separation of $H_2$ gas from the rest of the system desired. If it is desired to operate with a membrane then the cell will have a design similar to that of the cell shown in FIG. 3B with a vent for the $H_2$ gas to escape from the $-^{ve}$ electrode side of the cell, the electrolyte 24 being passed into the $+^{ve}$ electrode side of the cell. In such an alternative arrangement the vent 48 on electrolyte tank 34 would not be required.

Figure 4:
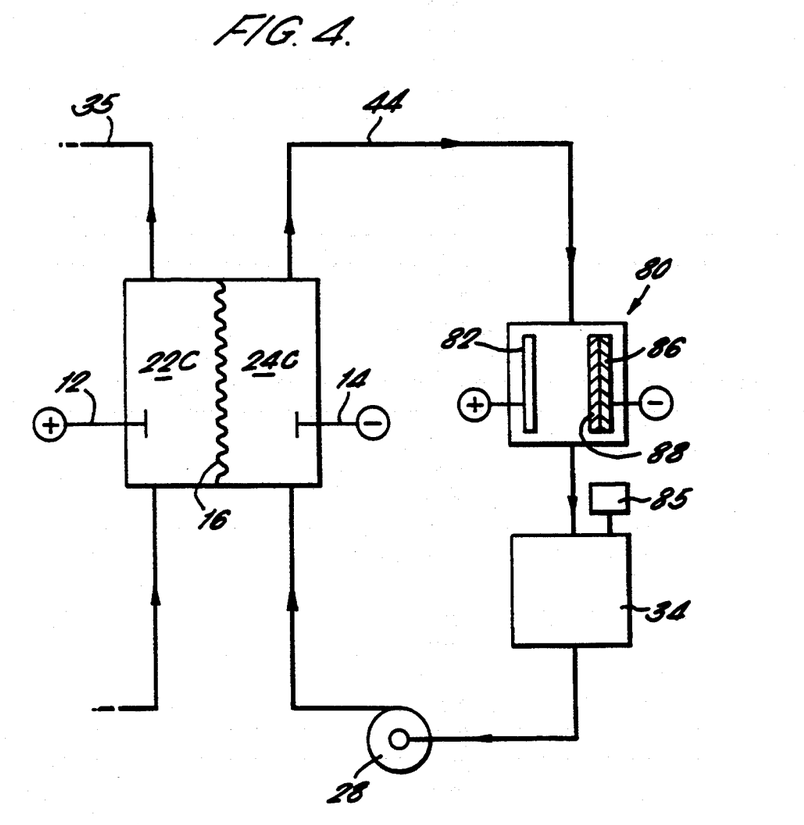
FIG. 4 is a block diagram of the pH control in the $-^{ve}$ side of a cell.

FIG. 4 illustrates an alternative pH compensation for use in a $-^{ve}$ side cell fluid circuit.

A pH control cell 80 is positioned in the flow path of the electrolyte 24 from the $-^{ve}$ chamber 24C of the cell. The $-^{ve}$ side of cell 80 has a "starved" cathode 86. A DC current is passed from the $+^{ve}$ electrode 82 to the $-^{ve}$ electrode 86, electrolyzing water to produce $H_2$ gas at the cathode 86, with the $OH^-$ ions also produced raising the pH of the electrolyte solution and thus compensating for the migration of $OH^-$ ions from the $-^{ve}$ side to the $+^{ve}$ side of cell 10. The cathode 86 of cell 80 is "starved" to maximize the $OH^-$ ion production and to minimize the production of sodium sulfide. The starving of the cathode 86 is accomplished by surfacing the cathode with a thick porous layer 88 which reduces the availability of the sodium polysulfides at the $-^{ve}$ electrode surface, thus promoting the electrolysis of water. A preferred porous surfacing for the cathode 86 is an unwoven polypropylene cloth, such as Webril cloth made by the Kendall Co.

At the $+^{ve}$ electrode of the pH control cell 80 the following reaction occurs:

Eq. 10A  $S + Na_2S_x \rightleftharpoons Na_2S_{x+1}$

At the $-^{ve}$ electrode of the pH control cell 80 the following reaction occurs:

Eq. 10B  $H_2O + e^- \rightleftharpoons OH^- + \tfrac{1}{2}H_2$

The $H_2$ gas may be vented from the tank 34 by means of a vent 85.

The pH control cell 80 may, if desired, employ a membrane in order to divide the cell into a $+^{ve}$ chamber and a $-^{ve}$ chamber. In such an embodiment the $H_2$ gas product may be vented directly from the $-^{ve}$ chamber of the cell.

Fabrication of Electrodes

End electrodes differ from the mid electrodes because they must have a metallic conductor embedded within the structure running across the electrode area. This is required because the resistivity of the substrate material from which they are formed is too high to allow adequate electrical conduction to an external electrical connector. For example a 25 cm by 25 cm (10 inch by 10 inch) square of substrate material of 0.25 cm (0.10 inch) thickness will have a resistance of about 10 ohms where a corresponding cell has an internal resistance of about 0.01 ohms. A sheet of copper of 0.025 cm thickness with approximately the same area embedded into the electrode will reduce the effective resistance to about 100 micro ohms. The end electrodes are unipolar, whereas the mid-electrodes are bipolar. The conductor sheet is a thin screen structure embedded along the length of the end electrodes which make mechanically good contact along the current path.

The process of making the bipolar mid-electrodes is as follows. Substrates are formed of graphite flakes mixed with a plastic binder or other suitable binder, generally in a 1:1 weight ratio of such components. The mixture is freed from moisture by heating and/or desiccation methods, formed as sheets and hot pressed at temperatures and pressures appropriate to the materials used.

Then the substrates are coated on the $-^{ve}$ surface with activated carbon particles, and on the $+^{ve}$ surface with silicon dioxide or a mixture of silicon dioxide/activated carbon particles by placing a sprinkling of such particles on mold plate surfaces and hot pressing the substrates to complete sealing of all voids in the substrate and to embed the particles in its surfaces. Other preferred embodiments use in place of the silicon dioxide any of the zeolites, other such silicates, or like materials, either natural or synthetic. Suitable types of activated carbon for use in surfacing the electrodes are G212 of North American Carbon Co., UU of Barnebey-Cheney Co., GAC of Calgon Carbon Co., or PCB of Calgon Carbon Co.

After each pressing step the press mold and its contents are cooled under pressure by using a water cooled heat exchanger to safeguard against bowing or warping and also to ensure a compact, non-porous structure.

End electrodes are prepared by making substrates by mixing graphite flakes and a plastic binder together, in the same general manner as described for the process of making bipolar mid-electrodes.

These substrates are then formed into a sandwich with a conductive screen, e.g. a copper screen, placed therebetween. This assembly is hot pressed to form the end electrode substrate and cooled under pressure to minimize warping.

One surface of this substrate is then surfaced with activated carbon or silicon dioxide particles or a mixture of activated carbon/silicon dioxide particles, depending on whether a $-^{ve}$ electrode or a $+^{ve}$ electrode is being formed. This is effected by placing a sprinkling of the required particles (activated carbon or silicon dioxide) on the electrode surface and hot pressing to embed the particles in the surface thereof. After each pressing step the press mold and its contents are cooled, for example using a water-cooled heat exchanger to safeguard against bowing or warping.

Membranes

One membrane which may be used in the bromine system described in the present invention is a cation exchange membrane formed from a fluorocarbon polymer grafted with styrene via gamma irradiation and functionalized with sulfonic acid or carboxylic acid end groups. The fluorocarbon is preferably a fluorinated ethylene-propylene copolymer. The membrane is prepared by grafting the styrene onto the fluorocarbon polymer using gamma irradiation and then sulfonating the grafted polymer, for example by using chlorosulfonic acid or functionalizing with carboxylic acid groups.

This membrane is preferably from 0,005 to 0.0175 cm (0,002 to 0,007) inches thick, more preferably about 0.0125 cm (0.005 inches) thick. The membranes are made from an ethylene-propylene copolymer base film of the desired thickness which is grafted with styrene via gamma irradiation, for example from a cobalt-60 source. The radiation grafting of vinyl-substituted monomers to polyolefin films is known in the art and reference is made to U.S. Pat. Nos. 4,230,549 and 4,339,473.

In preparing a typical membrane for use in the present invention, the fluorocarbon film is wound with an interlayer of absorbent paper into a bulk roll which is then introduced into a stainless steel reaction vessel. A solution of styrene in a suitable solvent such as methylene chloride is then transferred into the reaction vessel and the bulk roll allowed to soak, for example for 24 hours. The system is then evacuated to remove oxygen and the bulk roll exposed to gamma irradiation, for example from a cobalt-60 source to a pre-determined total dose. The bulk roll is then washed and subjected to sulfonation by reaction with, for example, chlorosulfonic acid. Sulfonation may also be achieved using fuming sulfuric acid.

The gamma irradiation of the fluorocarbon polymer forms free radical sites which are then available for reaction with the styrene monomer. The electrical resistance of the ion exchange membrane is directly related to the percentage of styrene grafted thereon when subsequently sulfonated, the electrical resistance decreasing as the percent graft increases. In general the useful range of the percent graft is from 10% to 35%, more preferably 10% to 20%. Percent graft is defined as the weight increase due to grafting divided by the initial weight of the polymer film multiplied by 100. The electrical resistance of the membrane is also related to the percentage of sulfonation which will generally be in the range of from 5% to 30%, more preferably 12% to 20%, the electrical resistance decreasing as the percentage of sulfonation increases.

The above described membrane for use in the present invention has carbon-fluorine bonds which will resist bromine, bromide or free radical bromine and thus has a long life in the harsh environment of the energy storage and/or power delivery systems wherein the electrolyte in the $+^{ve}$ chamber during power delivery contains bromine and the electrolyte in the $-^{ve}$ chamber during power delivery contains a sulfide. Furthermore, the membrane has very low diffusion rates for bromide and sulfide ions. In a preferred embodiment the membrane is 0.0125 cm (0.005 inches) thick which will decrease diffusion (so that the cell will not self-discharge). The resistance in a 2N NaOH solution is about 0.10 to 0.20 ohms per square cm or about 0.015 to 0.03 ohms per square inch.

Other specifications for this membrane are a permselectivity in 1N KCl solution of about 85% and a resistance of 0.20 to 1.0 ohms per square cm in a 0.60 N solution of KCl.

The membrane will perform in the preferred process of the invention based on the bromine and sulfur reactions described above for over 100 cycles in 2 molar concentrations of $Br_2$ at full charge with no perceptible degradation. In addition, little sulfur migrates to the $+^{ve}$ side electrolyte during use, the membrane being essentially impervious to sulfur ions.

Another membrane which may be used in the present invention is a cation exchange membrane formed from a copolymer of tetrafluoroethylene and a sulfonated or carboxylated vinyl ether, such as those sold under the trade names of Nafion (Du Pont) and Flemion (Asahi Glass). These membranes have carbon-fluorine bonds which will resist bromine, bromide or free radical bromine and thus have a long life in the energy storage and/or power delivery systems as described herein.

A lower cost substitute, which may be used in the iron system, is a heterogeneous structure made by Sybron Chemical Co. called IONAC MC3470. This is a cation exchange structure containing sulfonated resins as the functional materials bonded together with Kynar. The material is bonded to a fibrous support sheet of glass cloth or other polymer fiber. The specifications for this membrane are: 0.040 cm (0.016 inches) thick, 96% permselectivity and a resistance of 5 ohms per square cm in 1N NaCl. The cost is lower, but the electrical resistance is higher, than the first described membrane.

Compensation For Migration

One concern in the recycling of the electrolyte on the $-^{ve}$ side of the bromine system is the balancing of the migration of bromine ions from the $+^{ve}$ side to the $-^{ve}$ side. Referring to FIG. 1A, there is some diffusion of the bromine ions into the $-^{ve}$ electrode side resulting in a reagent loss on the $+^{ve}$ side, an electrolyte composition imbalance and a coulombic loss. This situation may be corrected by introducing NaBr of an appropriate concentration into the $-^{ve}$ electrode side to provide Br$-$ ions which diffuse back to the $+^{ve}$ side and so balance the bromine migration from the $+^{ve}$ side. Referring to FIG. 2, NaBr may be introduced along line 30 to mix with electrolyte 24 coming from tank 34.

The corresponding concern of migration of sulfur ions from the $-^{ve}$ side to the $+^{ve}$ side of the membrane is handled as follows. The sulfur ions precipitate as sulfur when in the $+^{ve}$ side electrolyte. Referring to FIG. 2, the $+^{ve}$ electrolyte containing the sulfur is pumped by pump 26 through the valve 27 where it is physically filtered in the assembly 25. The electrolyte in the negative side is arranged by the valves 29 to bypass the filter 25. But at periodic times, the period being determined by the specifics of the application, the valves 27, 29 and 31 are changed such that the $-^{ve}$ side electrolyte travels through the filter 25 and the $+^{ve}$ side electrolyte bypasses the filter 25. When this occurs the free sulfur in the filter passes into solution and so is recycled in the $-^{ve}$ side electrolyte. When all the sulfur is dissolved the valves switch back to the first described state.

In both systems, because water is transferred across the membrane by osmosis or electro-osmosis, it becomes necessary to correct for this happening. This is accomplished by transferring water to the depleted side by, for example, reverse osmosis.

Power Enhancement

The surfaces of the electrodes in the $+^{ve}$ and the $-^{ve}$ sides are coated with porous materials with high surface areas. Activated carbon is used on the $-^{ve}$ electrode and silicon dioxide or a mixture of activated carbon/silicon dioxide on the $+^{ve}$ electrode for the bromine system, whilst activated carbon particles are used on the $+^{ve}$ electrode in the iron system. The silicon dioxide particles act to absorb the bromine out of solution in the $+^{ve}$ side and provide for better contact with the electrode surface and electrolyte. The activated carbon absorbs the $S^{2-}$ solution in the $-^{ve}$ side of the system. This porous material provides a large surface area and so enhances the availability of the sulfur during discharge. This enhancement provides better performance by maintaining the output voltage and power even when the cell is near complete discharge. Polarization losses are low.

Use of Complexing Agents

In some applications it is desirable to control bromine. Although there are a number of compounds which will form complexes or co-ordination compounds with bromine, most are not compatible with the electrochemical environment or will be quickly attacked by the oxidizing bromine.

One of the most compatible materials for complexing with bromine in solutions of high molarity salts is a polyalkylene glycol such as polyethylene glycol. This is an aliphatic ether chain and the $Br_2$ becomes trapped and/or attached to this structure in a high weight ratio. The trapping and/or attaching of the bromine is thought to be partly by mechanical trapping of the bromine in the interstices of a tangle of polymer chains in addition to weak electrical forces. In such use the vapor pressure of free bromine is substantially reduced, thereby making the system safer and more easily handled.

The polyethylene glycol may be obtained in a wide range of molecular weights, but even at high (4000) molecular weights the material is easily dissolved in water. Preferred proportions are 25 to 100 grams of polyethylene glycol to 300 to 500 grams of NaBr per liter of electrolyte in a discharged state.

The addition of the complexing agent increases the viscosity of the electrolyte making the pumping of the electrolyte somewhat more difficult. But, more importantly, the addition of the complexing agent increases the resistance of the electrolyte and therefore the internal resistance of the cell. Thus there is a trade off between adding enough complexing agent to fully engage all the bromine possible at full charge and increasing the internal resistance of the cell.

The charging of the cell can be limited to a given value to ensure that excess bromine will not be formed. In addition agents may be used to complex the bromine in the storage tanks, but to produce uncomplexed bromine in the cell itself thereby maintaining the low internal resistance of the cell.

The complexing agent also may form wax like (yet dissolvable in water) deposits that are completely dissolved upon discharge of the cell. Practical use would indicate that the cell was discharged on some regular basis, again dependent upon the application.

The available energy is scarcely reduced by the use of the complexing agent and the conversion of the energy is not encumbered as the bromine freely comes away from the complexing agent. In addition there is minimal detrimental interaction of the complexing agent within the pH compensation modules.

Other useful complexing agents include: tetra-alkylammonium halides, 2-pyrrolidone, n-methyl pyrrolidone, etc. In addition other heterocyclic compounds, e.g. ring structures with nitrogen atoms in the ring structure, such as pyridine compounds, are useable complexes with bromine.

Specific Embodiments

The present invention will be further described with reference to the following non-limiting Examples.

EXAMPLE 1

Fabrication of End Electrodes

Two substrates were prepared by mixing graphite flakes (#4012 graphite flakes of Asbury Carbon Co.) with a polyvinylidene fluoride, PVDF, binder (Penwalt's #461) in a 1:1 weight ratio. The mixture was heated to remove moisture, formed into sheets and hot pressed at a temperature of 177° C. (350° F.) and a pressure of 1723 kPa (250 psi) for 10 minutes, and then cooled at the same pressure between water cooled platens.

A stack was then formed, from bottom to top, of an aluminum base plate, Teflon sheet, substrate, a copper screen (0.025 cm thick), the other substrate, a Teflon sheet, high temperature rubber sheet, and finally another aluminum base plate. The assembly was then pressed at 1034 kPa (150 psi) at 177° C. (350° F.) for 10 minutes, and then cooled at the same pressure between water-cooled platens.

The substrate to be surfaced had its edges covered with tape and was placed on an aluminum base plate covered with a Teflon sheet, and a mixture of 80% graphite and 20% Kynar sprinkled over the surface. The surface of the substrate was then sprinkled with a layer of activated carbon particles (G212 of North American Carbon Co., or UU of Barnebey-Cheney Co. or PCB activated carbon).

A high temperature rubber sheet was placed on top of the surfaced substrate, followed by a Teflon sheet and an aluminum base plate. The structure was then pressed at 517 kPa (75 psi) at 177° C. (350° F.) for 10 minutes, and then cooled at the same pressure between water-cooled platens.

The tape was then removed from the edges of the surfaced side and a rubber "picture" frame placed on top of the cleared border. The electrode was then placed with the surfaced side uppermost onto an aluminum base plate covered with a Teflon sheet and the top surface of the structure covered with a Teflon sheet and an aluminum base plate. The edges of the assembly were pressed at 2413 kPa (350 psi) at 177° C. (350° F.) for 210 minutes, and then cooled at the same pressure between water-cooled platens. This step sealed the substrate sheets along the edges in order to ensure that the copper screen was totally encapsulated to prevent corrosion by the electrolyte.

Cell Fabrication

A sealed single cell was made by placing a $+^{ve}$ electrode and a $-^{ve}$ electrode together with an IONAC MC3470 membrane therebetween. The four edges of the cell were cast with an epoxy resin to encapsulate the cell and ports formed to allow the electrolytes to be supplied to and to be removed from the cell.

Plastic supporting plates were placed up against the electrodes, these plates forming the outside surface of the cell, the ports being made through these plates. Plastic screens were placed on either side of the membrane to maintain a proper separation between the electrodes and provide a flow region for the electrolytes. The screens were constructed to ensure turbulence in the flow over the surfaces of the electrodes.

The construction of the cell ensures that the copper screens and the wires attached, which make electrical contacts to the cell, do not contact the electrolyte.

The total spacing between the electrodes was about 0.16 inches. The cell internal resistance for a 24 square inch active cell area, was about 0.060 ohms.

Cell Performance

The above described cell, with PCB carbon surfaced electrodes, was used with the following circulating electrolytes: Positive side ... 200 cc of 6 molar solution of NaBr Negative side ... 200 cc of 1.5 molar solution of $Na_2S_5$ Cell resistance ... 0.06 ohms The negative solution was prepared by dissolving about 60 grams of powdered sulfur in 200 cc solution of 1.6 molar $Na_2S$. The sulfur was dissolved by heating the sodium sulfide solution to about 90° C. and slowly introducing the sulfur whilst stirring the mixture. All of the sulfur went into solution, indicating that a final polysulfide solution of sodium in excess of the $Na_2S_5$ form.

The cell solutions were in the fully discharged state initially when the charge mode was first started at the beginning of cycle #1.

The cell was put through eight cycles to generally characterize pH changes with and without a pH compensating cell in operation to control the pH of the $+^{ve}$ electrolyte. The cell was charged at a constant 4 amps for 4 hours, then it was connected across an electrical load and discharged at a constant 4 amps until a 0.50 volt cut-off was reached. Six cycles with no pH compensation were carried out in this manner, while pH readings in the $-^{ve}$ and $+^{ve}$ solution tanks were recorded.

At the beginning of the seventh cycle a pH control cell immersed in the $+^{ve}$ solution tank was brought into operation and run at 0.5 amps DC during the subsequent two cycles, i.e. cycles seven and eight.

The pH control cell was constructed of unsurfaced electrodes. It had an active area of 7.74 sq.cm (1.2 square inches), and an interelectrode spacing of 0.94 cm (⅜ inch). The cell operated at about 1.7 volts.

The conditions of the cell are summarized as follows:
$+^{ve}$ side pH initially ... 7.7 after 6 cycles ... 0.3 after 2 cycles of pH correction. 5.5
$-^{ve}$ side pH initially ... 13.1 after 6 cycles ... 11 after 2 cycles of pH correction. 12

Figure 5:
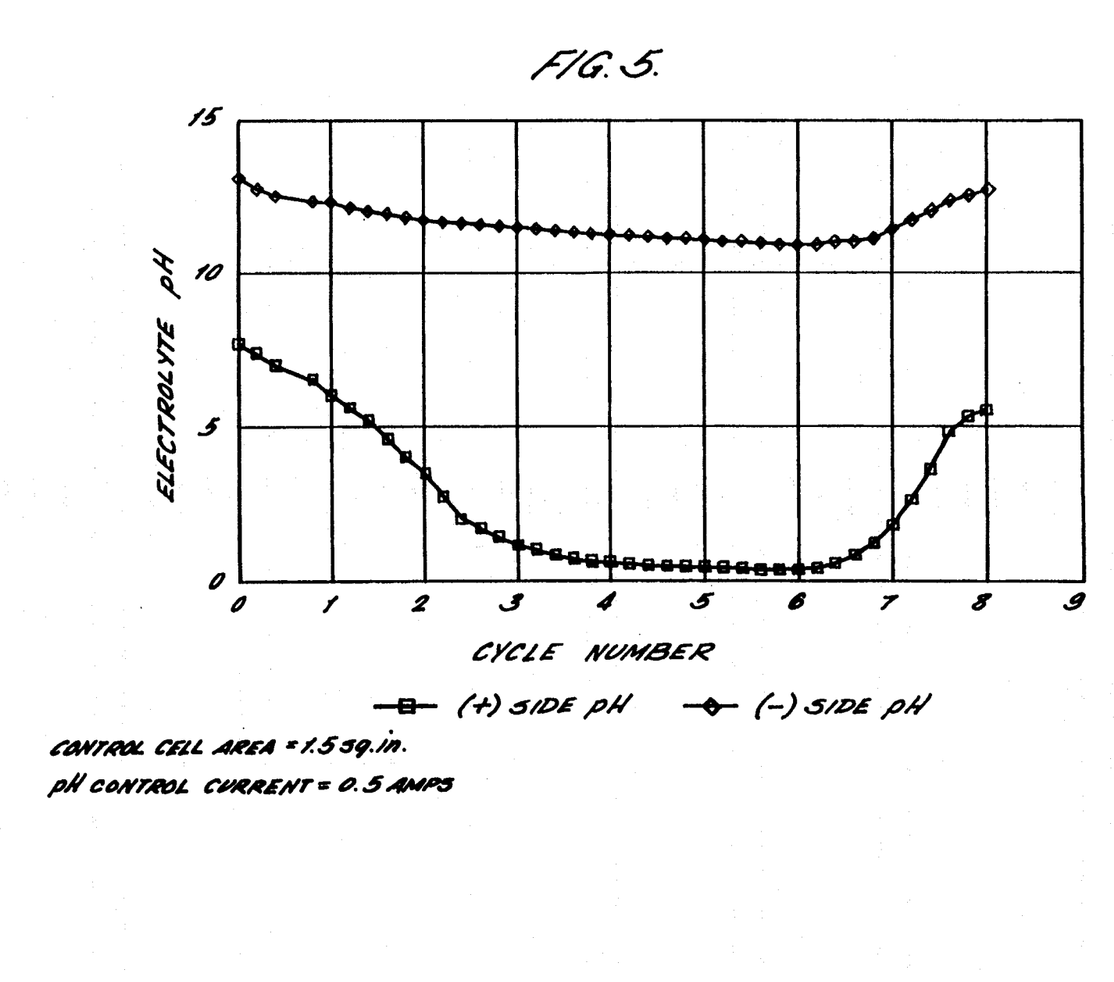
FIG. 5 is a typical cycle for a single cell.

FIG. 5 shows the variation in pH as the cycles proceeded. Each complete cycle was eight hours in duration. Hence, the experiment required 64 hours to complete.

The reactions taking place within the pH compensation (control) cell are presented below:

Eq. 13A at the $+^{ve}$ electrode $2Br^- \rightarrow Br_2 + 2e^-$

Eq. 13B at the $-^{ve}$ electrode
$2e^- + 2H_2O \rightarrow H_2 + 2OH^-$

Bromine was generated at the $+^{ve}$ pH control cell electrode and merely added to the charging process. Hydroxyl ions were produced in the solution at the $-^{ve}$ pH control cell electrode, thus raising the pH, and restoring the balance necessary for the proper operation of the cell. If the pH decreases too far in the $-^{ve}$ solution, unwanted $H_2S$ will be produced within the electrolyte.

About 8 AH of charge were dissipated over the total time period to restore the pH values of the cell. However, this represents only 3% of the total 128 AH of charge put into the cell during the 32 hours of charging at 4 amps.

EXAMPLE 2

A sealed single cell was made by placing a PCB carbon surfaced $-^{ve}$ electrode and a diatomaceous earth surfaced $+^{ve}$ electrode together with a cation exchange membrane formed from a fluorocarbon polymer grafted with styrene via gamma irradiation and functionalised with sulfonic acid groups (RAI S24 4010-5). The spacing between the membrane and each electrode was 0.5 cm.

This cell was used with the following circulating electrolytes: Positive side . . . 300 cc of 4 molar NaBr Negative side . . . 300 cc of 0.25 molar $Na_2S_5$ and 1 molar $Na_2S$ The electrolyte flow rates were approximately 0.5 liter/minute through each of the compartments. The cell active surface area was 155 $cm^2$.

This cell was operated with pH control cells of the type as described in Example 1 immersed in both the $+^{ve}$ and $-^{ve}$ electrolyte tanks. The pH control cells were run at about 0.85 amps DC on the $+^{ve}$ side and at between 1.5 and 2 amps DC on the $-^{ve}$ side over two cycles during which the cell was charged and discharged at a constant 2 amp rate.

Figure 6A:
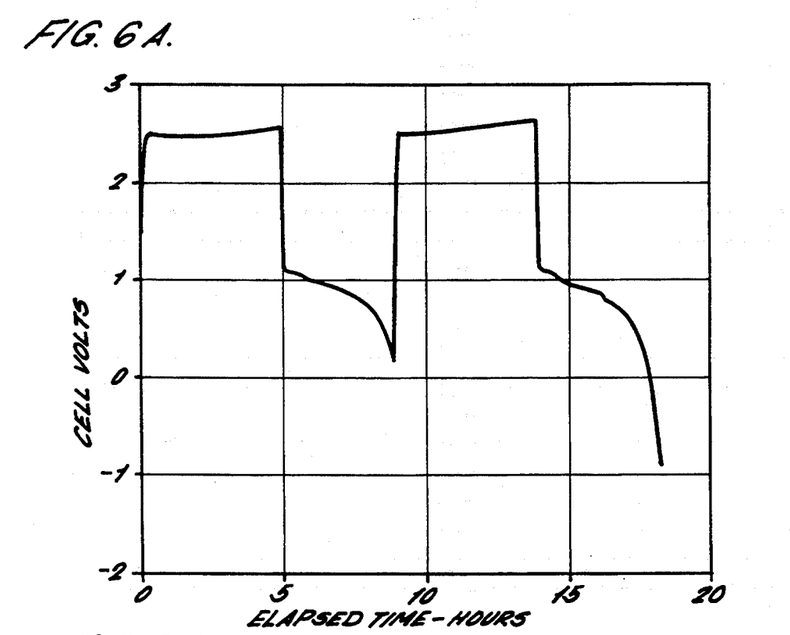
FIGS. 6A to 6C illustrate pH control in the cell described in Example 2.
Figure 6B:
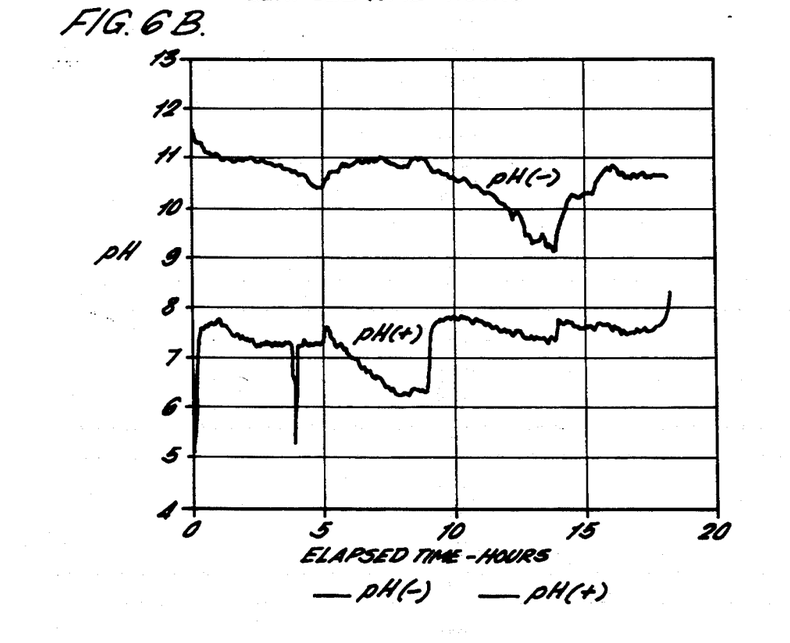

FIG. 6A illustrates the cell voltage during the cycling of the cell. FIG. 6B illustrates the pH of the positive and negative electrolytes during the operation of the cell. It will be noted from this graph that with the pH control cell in the $+^{ve}$ electrolyte the pH value of the $+^{ve}$ electrolyte is maintained at a reasonably high level. Furthermore, with the pH control cell in the $-^{ve}$ electrolyte the pH value of the $-^{ve}$ electrolyte was maintained at a reasonably high level over most of the cycle.

Figure 6C:
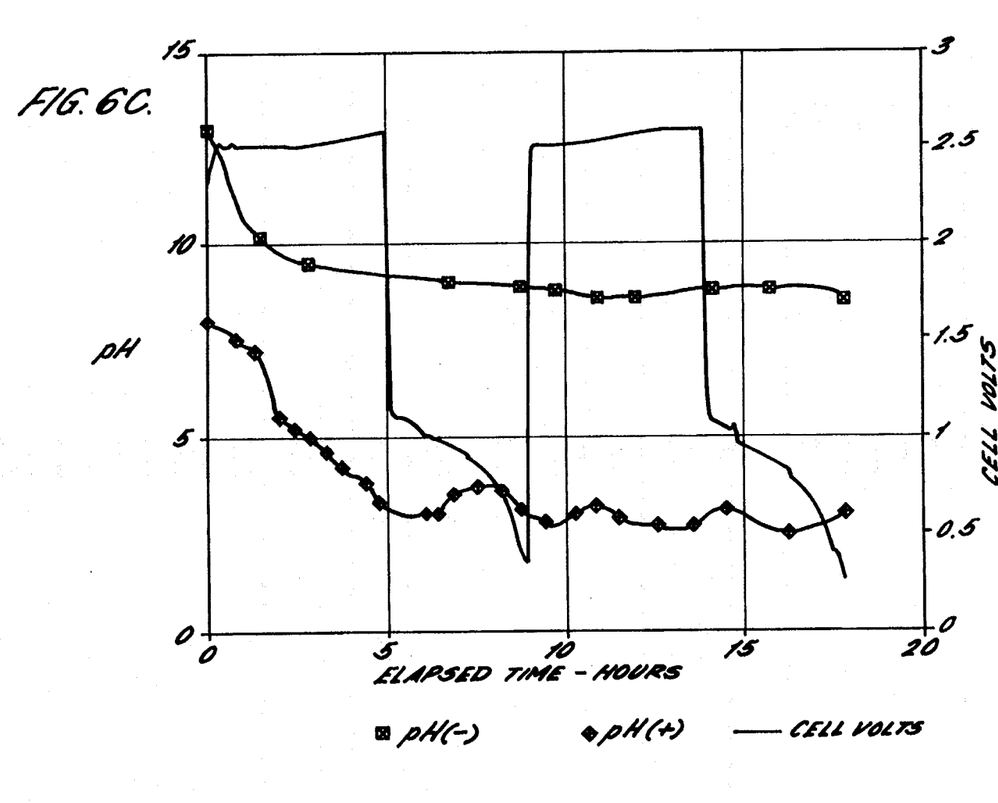

The cell was then operated over two more identical cycles without any pH control cell in either the $+^{ve}$ or $-^{ve}$ electrolyte. FIG. 6C illustrates both the cell voltage and the pH of the $+^{ve}$ and $-^{ve}$ electrolytes. It will be noted that the pH of both the $+^{ve}$ and $-^{ve}$ electrolytes falls very significantly when no measures are taken to control the pH.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An electrochemical apparatus for energy storage and/or power delivery comprising:
   (a) means for maintaining and circulating electrolyte flows in a fully liquid system in which the active constituents are fully soluble in a single cell or in an array of repeating cell structures, each cell with a chamber ($+^{ve}$ chamber) containing an inert $+^{ve}$ electrode and a chamber ($-^{ve}$ chamber) containing an inert $-^{ve}$ electrode, said chambers being separated one from another by an ion exchange membrane, the electrolyte circulating in the $-^{ve}$ chamber of each cell during power delivery containing a sulfide, and the electrolyte circulating in the $+^{ve}$ chamber during power delivery containing a liquid oxidizing agent,
   (b) means for restoring or replenishing the electrolytes in said $+^{ve}$ chamber and $-^{ve}$ chamber by circulating the electrolyte from each chamber to storage means comprising a volume of electrolyte greater than the cell volume for extended delivery of power over a longer discharge cycle than the cell volume alone would permit, and
   (c) a pH compensation cell to compensate for pH changes and/or changes in the concentration of hydroxyl ions in the $-^{ve}$ chamber, the pH compensation cell having a $-^{ve}$ electrode which is adapted to reduce the availability of polysulfides at the surface thereof, thereby promoting the electrolysis of water,
   (d) means for passing the $-^{ve}$ electrolyte through the pH compensation cell, and
   (e) means for driving an electric current through the $-^{ve}$ electrolyte in the pH compensation cell, thereby generating $OH^-$ ions by the decomposition of water.

2. Apparatus as defined in claim 1 wherein the $-^{ve}$ electrode of the pH compensation cell is surfaced with a thick porous layer to reduce the availability of polysulfides at the $-^{ve}$ electrode surface.

3. An apparatus as claimed in claim 2, wherein the thick porous layer comprises an unwoven polypropylene cloth.

4. An apparatus as claimed in claim 1, wherein the liquid oxidizing agent comprises bromine.

5. An electrochemical process for energy storage and/or power delivery comprising:
   (a) maintaining and circulating electrolyte flows in a fully liquid system in which the active constituents are fully soluble in a single cell or in an array of repeating cell structures, each cell with a chamber ($+^{ve}$ chamber) containing an inert $+^{ve}$ electrode and a chamber ($-^{ve}$ chamber) containing an inert $-^{ve}$ electrode, said chambers being separated one from another by an ion exchange membrane, the electrolyte circulating in the $-^{ve}$ chamber of each cell during power delivery containing a sulfide, the electrolyte circulating in the $+^{ve}$ chamber during power delivery containing a liquid oxidizing agent,
   (b) restoring or replenishing the electrolytes in said $+^{ve}$ chamber and $-^{ve}$ chamber by circulating the electrolyte from each chamber to storage means comprising a volume for extended delivery of power over a longer discharge cycle than the cell volume alone would permit, and
   (c) compensating for pH changes and/or changes in the concentration of hydroxyl ions in the $-^{ve}$ chamber by passing the $-^{ve}$ electrolyte through a pH compensation cell having a $-^{ve}$ electrode which is adapted to reduce the availability of polysulfides at the surface thereof, and driving an electric current through the $-^{ve}$ electrolyte in the pH compensation cell, thereby generating $OH^-$ ions and hydrogen gas by the decomposition of water.

6. A process as claimed in claim 5 wherein the liquid oxidising agent comprises bromine.

* * * * *